March 27, 1951  H. J. ROSE  2,546,785
HEATING APPARATUS
Filed Oct. 8, 1945  5 Sheets-Sheet 4

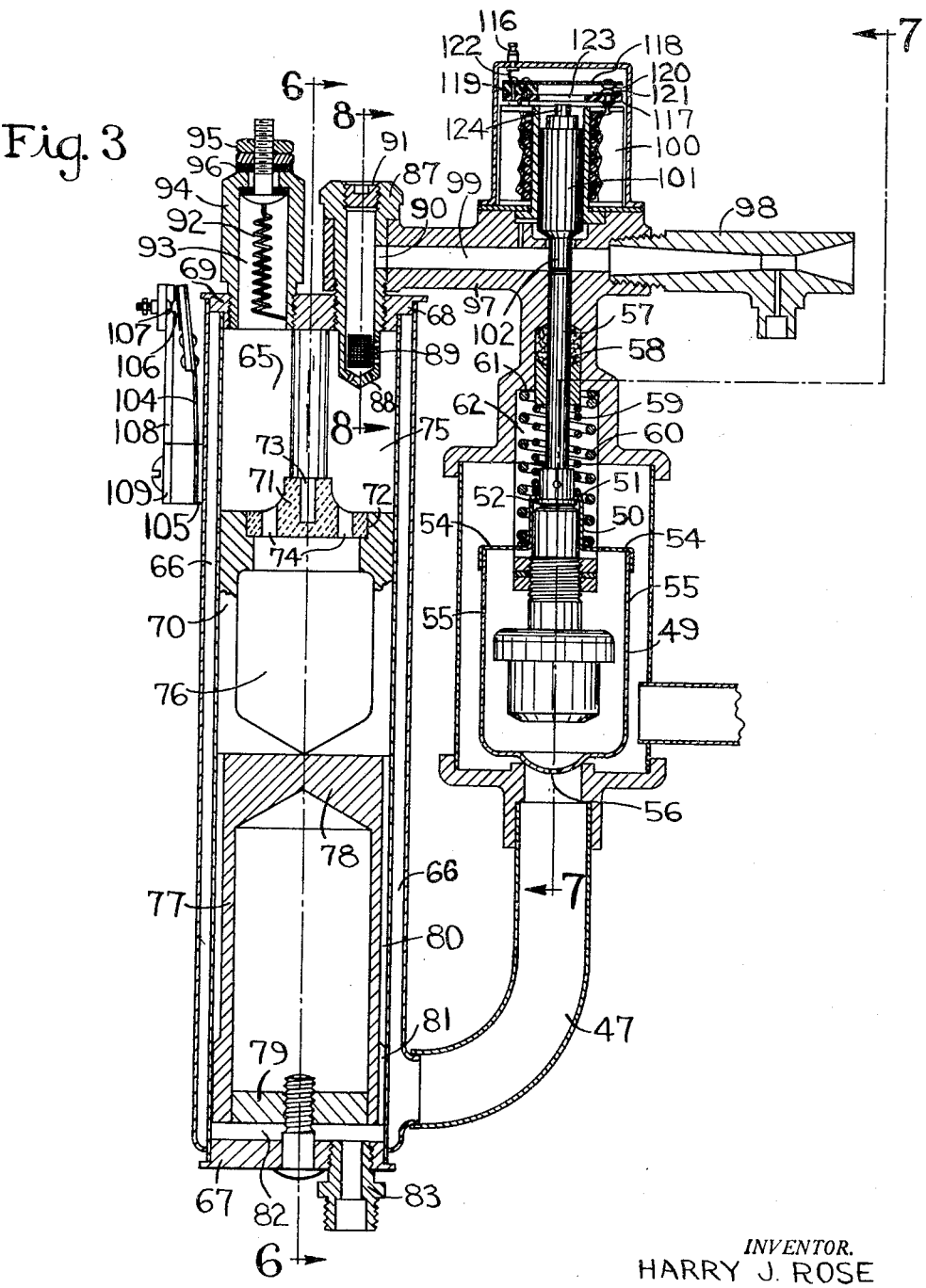

INVENTOR.
HARRY J. ROSE
BY G. H. Braddock
ATTORNEY

March 27, 1951  H. J. ROSE  2,546,785
HEATING APPARATUS
Filed Oct. 8, 1945  5 Sheets-Sheet 5
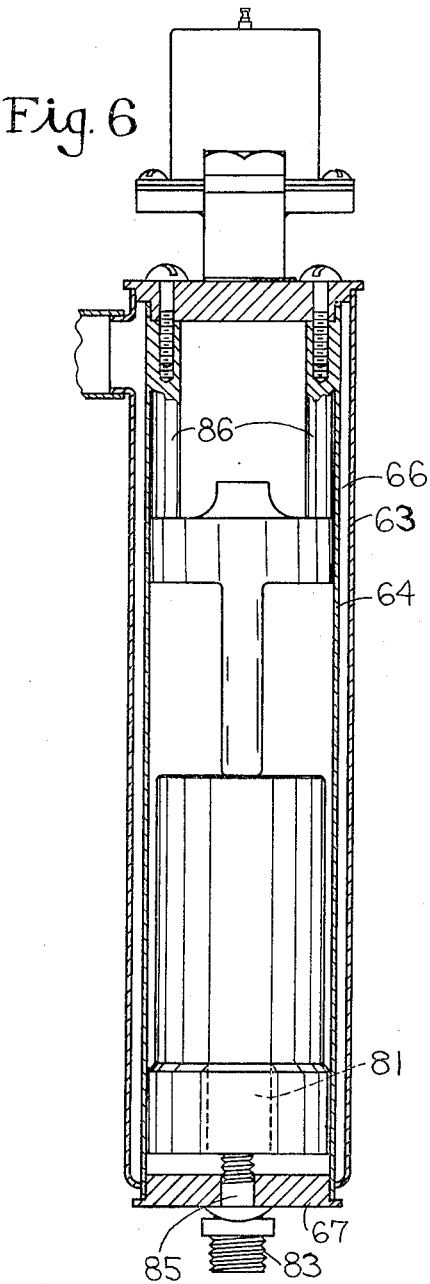
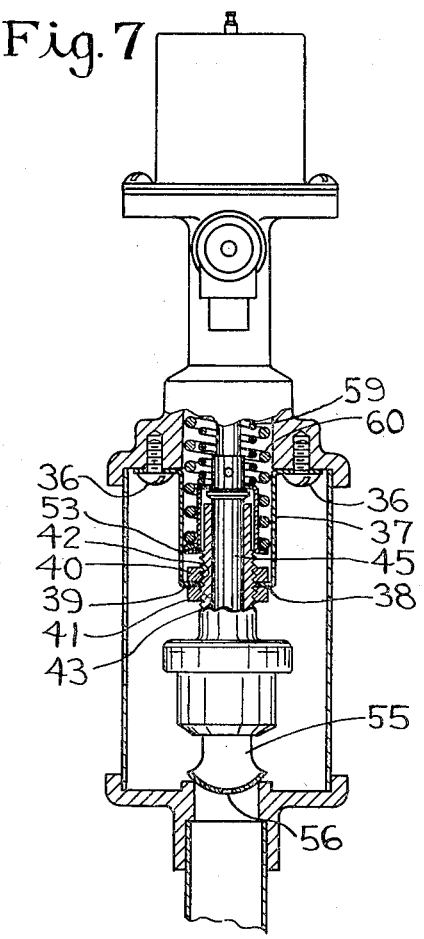
INVENTOR.
HARRY J. ROSE
BY G. H. Braddock
ATTORNEY Patented Mar. 27, 1951

2,546,785

UNITED STATES PATENT OFFICE 2,546,785

HEATING APPARATUS

Harry J. Rose, Three Rivers, Mich., assignor, by mesne assignments, to Edward J. Rose, Wilmington, Ohio Application October 8, 1945, Serial No. 621,084

9 Claims. (Cl. 237—8)

The present invention has relation to a heater, and has more especial reference to a heating apparatus for warming the interior space of an automotive vehicle body, such, for example, as a pleasure vehicle, taxicab, bus or truck.

An object of the invention is to provide in an automotive vehicle heating apparatus, including a construction and arrangement for diverting fluid-cooling or circulating medium from a cooling or circulating system of an internal combustion engine of the automotive vehicle and utilizing the diverted fluid-cooling or circulating medium to warm a passenger or other compartment of said automotive vehicle and including, also, provision for imparting under some conditions additional heat to the diverted fluid-cooling or circulating medium, a new and improved construction and arrangement for regulating and controlling operation of said heating apparatus.

A further object is to provide in a heating apparatus of the character as stated, including a construction and arrangement for at times employing fluid-cooling or circulating medium from and heated by and circulated by a cooling or circulating system of an internal combustion engine as heated fluid medium utilized in said heating apparatus for heating purposes and for at times utilizing heated fluid medium in said heating apparatus for heating purposes heated by means other than said cooling or circulating system, a construction and arrangement for regulating and controlling operation of the heating apparatus wherein will be incorporated various desirable and improved features and characteristics of construction which will be novel both as individual entities of said heating apparatus and in combination with each other.

A further object is to provide an automotive vehicle heating apparatus which will include a new and improved construction and arrangement for regulating and controlling operation of the heating apparatus.

A further object is to provide an automotive vehicle heating apparatus which will include novel and improved mechanism for controlling flow of fluid-cooling or circulating medium to a heat transfer unit located in a compartment of the automotive vehicle and for controlling application of heat to such medium by means other than an internal combustion engine of said automotive vehicle.

A further object is to provide an automotive vehicle heating apparatus which will include a new and improved fuel heating component.

A further object is to provide an automotive vehicle heating apparatus which will include valve mechanism for regulating and controlling flow of fluid-cooling or circulating medium, and a novel and improved construction and arrangement for actuating said valve mechanism.

A further object is to provide an automotive vehicle heating apparatus which will include a new and improved thermostatic control for operating valve mechanism of the heating apparatus for regulating flow of fluid-cooling or circulating medium.

A further object is to provide a heating apparatus, useful for a variety of purposes and especially useful to the purpose of warming interior spaces or compartments of automotive vehicles, which will include several novel and improved devices for regulating its control and some of which devices can be employed as independent entities for heating purposes, either in connection with the cooling or circulating system of an internal combustion engine, or otherwise.

And a further object is to provide a heating apparatus which will include features and characteristics of construction as hereinafter set forth.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 3 is a vertical sectional view, taken substantially on line 3—3 in Fig. 2;

Fig. 6 is a vertical sectional view, taken substantially as on line 6—6 in Fig. 3;

Fig. 7 is a vertical sectional view, taken substantially as on line 7—7 in Fig. 3.

Figure 1:
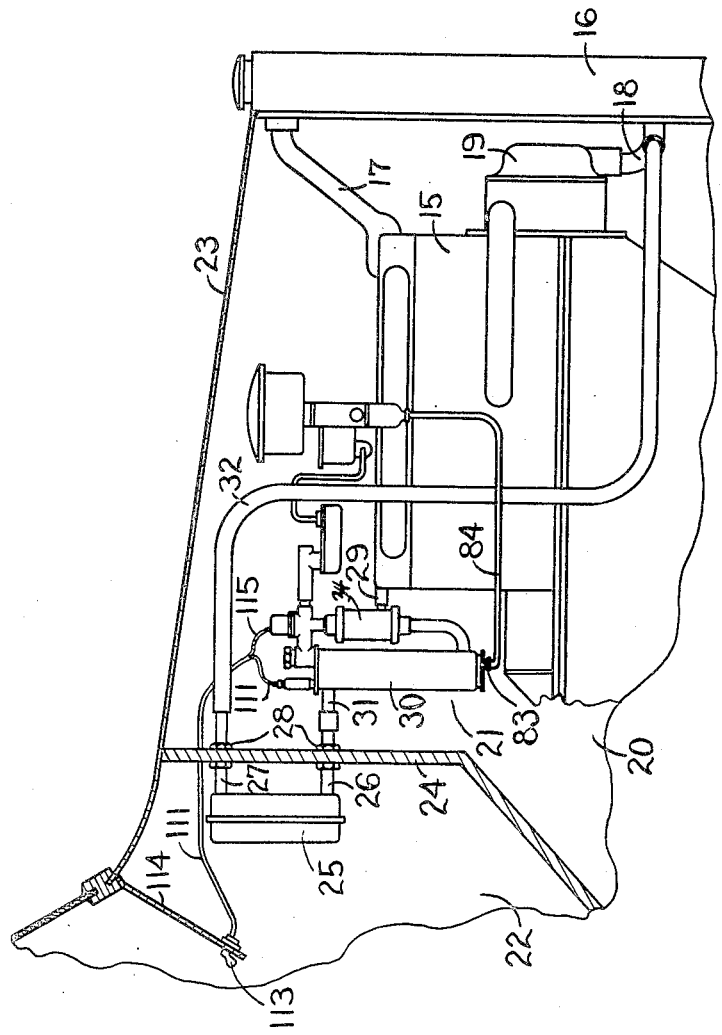
Fig. 1 is a side elevational view of a heating apparatus having the features and characteristics of the invention incorporated therein, disclosing said heating apparatus as when applied to an automotive vehicle.
Figure 2:
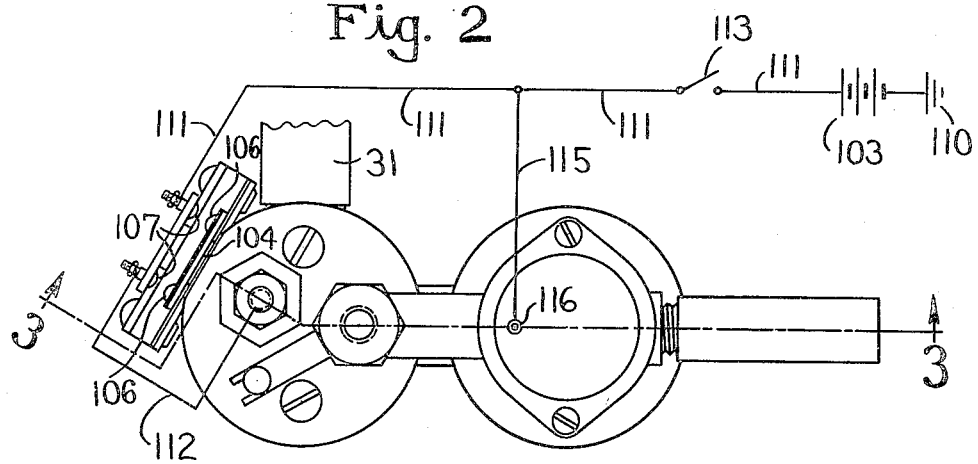
Fig. 2 is an enlarged fragmentary top plan view of the heating apparatus diagrammatically disclosing a wiring system for said apparatus.
Figure 8:
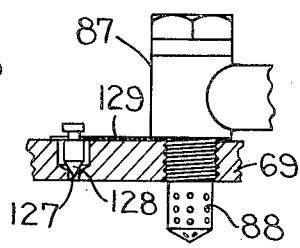
Fig. 8 is a detail sectional view, taken substantially as on line 8—8 in Fig. 3.

With respect to the drawings and the numerals of reference thereon, 15 denotes the engine jacket, 16 the fluid-cooling radiator, 17 the fluid connection from the jacket 15 to the radiator, 18 the fluid connection from said radiator to said jacket, and 19 represents, generally, the usual pump for the fluid-cooling or circulating medium of an automotive vehicle 20 of any ordinary or preferred character, such as a pleasure vehicle, taxicab, bus or truck. Ordinarily, the fluid-cooling or circulating medium is circulated by the pump 19 from the jacket 15 through the connection 17 to the radiator 16 and back to the jacket from the radiator through the connection 18.

The novel and improved heating apparatus, designated 21, is mounted partially within the body 22 of the automotive vehicle 20 and partially beneath the hood 23 of said automotive vehicle, numeral 24 indicating the dash of the automotive vehicle upon which a heat transfer unit 25 of the heating apparatus is supported.

The heat transfer unit 25, situated within the vehicle body 22, may be of any ordinary or preferred construction suitable to its well known purpose. A supporting structure for said heat transfer unit is constituted as tubular connections, denoted 26 and 27, respectively, the former leading into and the latter leading out of the heat transfer unit. As disclosed, end portions of the tubular connections 26 and 27 spaced from said heat transfer unit 25 enter openings (not shown) in the vehicle dash 24 and are made rigid with said vehicle dash by supporting nuts 28 upon said tubular connections 26 and 27. The usual casing of the heat transfer unit 25 is adapted to contain an assembly of core, motor and fan (not disclosed) of said heat transfer unit.

A connection 29 for travel of fluid extends from the engine jacket 15 to a mechanism 30, of structure and for purposes to be described, said mechanism has connection with the tubular connection 26 by a connection 31 at a side of the mechanism 30 opposite said connection 29, and a connection 32 extends from the tubular connection 27 to the connection 18 leading from the cooling radiator 16 to said engine jacket 15.

Were the mechanism 30 omitted from the heating apparatus, and, instead, the connection 29 directly attached to the connection 31 in communicating relation therewith, said heating apparatus would be operative in the manner as follows. Assuming the internal combustion engine of the automotive vehicle 20 to be in operation, there would be a substantial flow of heated fluid from the engine jacket 15 through the connections 29 and 31 and the tubular connection 26 to the heat transfer unit 25 and back to said engine jacket 15 through the tubular connection 27, the connection 32 and the connection 18. Any other suitable and preferred arrangement for circulating all or any desired portion of the heated fluid of the engine cooling system through the heat transfer unit 25 of course can be substituted for the arrangement disclosed. As illustrated, the flow of heated fluid from and back to the engine jacket is upward through the heat transfer unit. The flow from and back to the engine jacket could of course be downward through the heat transfer unit, the heated fluid in such event passing through a suitable connection attached to the upper tubular connection 27 here to enter the heat transfer unit and leaving said heat transfer unit by way of the lower tubular connection 26 and a suitable connection attached thereto.

The mechanism 30 by way of which the engine jacket 15 and the connection 29 are attached to the connection 31 is disclosed as situated beneath the hood 23, suitably and conveniently supported by the connections 29 and 31. A purpose of said mechanism 30 is to provide or supply heated fluid medium for the heat transfer unit 25 and to cause the provided or supplied heated fluid medium to be fed to said heat transfer unit independently of the cooling or circulating system as such of the internal combustion engine of the automotive vehicle 20, and a further purpose of the mechanism 30 is to render said internal combustion engine cooling or circulating system as such incapable of forcing or feeding heated fluid medium to the heat transfer unit 25 while said mechanism is causing heated fluid medium to be forced or fed to said heat transfer unit, as well as to render the mechanism 30 itself incapable of causing heated fluid medium to be forced to the heat transfer unit while this is being supplied or provided with heated fluid medium from the cooling or circulating system of the internal combustion engine of said automotive vehicle 20.

The mechanism 30 includes a control chamber 33 provided by a vertical, cylindrical container 34 housing a "Vernatherm" power element 35, and the connection 29 leads into said control chamber 33. "Vernatherm" temperature responsive power elements of a type suitable for use in the present heater are commercially available and since they are fully disclosed in United States Letters Patent among which are Patent No. 2,128,274 issued to Sergius Vernet and Patent No. 2,259,846 issued to Sergius Vernet et al., both assigned to Vernay Patents Company, a complete description thereof in the present specification is thought to be unnecessary, it being sufficient to mention that these power elements include a body of material expansible and contractible in response to changes in temperature. The upper base of the container 34 rigidly supports, as at 36, a U-shape bracket 37 which extends downwardly from said upper base and is situated in the control chamber 33 in spaced relation to the vertical, cylindrical wall of the container 34. The base 38 of the U-shape bracket 37 is horizontally disposed and is situated in an upper portion of said control chamber 33. Said base 38 includes a central opening 39 situated at the longitudinal axis of said container 34. A support for the power element 35 is constituted as upper and lower nuts, denoted 40 and 41, respectively, the nut 40 being engaged against and rigid with the upper surface of the base 38 and the nut 41 being engaged against and rigid with the lower surface of said base 38. The nuts 40 and 41 include vertically alined, internally threaded openings 42 and 43, the internally threaded opening 42 being directly above and the internally threaded opening 43 being directly below the central opening 39 in the base 38 of the U-shape bracket 37. A hollow, vertical upright 44 of the power element 35 includes an external thread engaged with the internal threads of the supporting nuts 40 and 41 in such manner that an upper portion of said hollow, vertical upright 44 is situated above the base 38 of the U-shape bracket 37 between and in spaced relation to its spaced apart, vertical arms and a lower portion of the hollow, vertical upright is situated below said base 38. An actuator rod of the power element 35, supported in the hollow, vertical upright 44 for slidable movement in vertical direction, is represented 45. Evidently, the U-shape bracket 37 and the supporting nuts 40 and 41 support the power element 35 and its hollow, vertical upright 44 in fixed relation to the container 34. Said power element 35 is adapted to be responsive to the temperature of fluid, usually water, in the control chamber 33, and the construction and arrangement are such that the actuating rod 45 will be raised in response to elevation of temperature in said control chamber and will have capacity to be lowered in response to drop of temperature in the control chamber.

An outlet 46 situated centrally in the lower base of the container 34 communicates with a connection 47 leading out of said container, and a valve 48 for controlling said outlet 46 is constituted as a part of a generally rectilinear frame 49 mounted within the casing 34 for reciprocatory movement in vertical direction. More explicitly, the rectilinear frame 49 includes an upper, vertical collar portion 50, in surrounding relation to the upper end portions of the actuating rod 45 and the hollow, vertical upright 44, having an inwardly extending, annular flange 51 upon its upper end seated against the upper surface of an annular flange 52 integral with said upper end portion of said actuating rod 45. A horizontal disc portion 53 of said rectilinear frame 49 is integral with and extends outwardly from the lower end of said collar portion 50. The horizontal disc portion 53 integrally supports oppositely extending ears 54, 54 which are at right-angular relation to the spaced apart legs of the U-shape bracket 37, and said oppositely extending ears 54, 54 rigidly support spaced apart, vertical arms 55, 55 of said rectilinear frame 49. The lower ends of said spaced apart, vertical arms 55, 55 are integral with opposite side portions of the valve 48, and said valve is situated within the part of the control chamber 33 between the power element 35 and the outlet 46. A small bleeder hole through the valve 48, denoted 56, is provision for limited passage of fluid medium from the connection 29 through the control chamber 33 and past said valve 48 to the connection 47 when the valve 48 is in closed position.

An upper portion of the container 34, above the hollow, vertical upright 44 of the power element 35, in spaced relation to said hollow, vertical upright, suitably and conveniently slidably supports a shut-off valve 57 which is constituted as a cylindrical plunger vertically alined with and having its lower end rigidly connected to the actuating rod 45. Suitable packing for the shut-off valve or cylindrical plunger 57, situated in the upper portion of the container 34, is indicated 58.

A relatively light compression coil spring 59, situated in spaced, surrounding relation to the upper end portion of the actuating rod 45 and the lower end portion of the shut-off valve or cylindrical plunger 57, has its upper end engaged against the packing 58 and its lower end engaged against the upper surface of the inwardly extending, annular flange 51 upon the upper, vertical collar portion 50 of the rectilinear frame 49, and a comparatively heavier compression coil spring 60, situated in spaced, surrounding relation to the compression coil spring 59 and to the upper, vertical collar portion 50 of said rectilinear frame 49, has its upper end engaged against a downwardly facing surface 61 defining the upper base of a concavity 62 in the upper base of the container 34 and its lower end engaged against the upper surface of the horizontal disc portion 53 of said rectilinear frame 49. The relatively light compression coil spring 59 is under compression to resiliently urge the rectilinear frame 49 downwardly and the packing 58 upwardly, and the comparatively heavier compression coil spring 60 is under compression also to resiliently urge said rectilinear frame downwardly. Engagement of the valve 48 with the valve seat surrounding the outlet 46 from the container 34 limits the extent of downward movement of the rectilinear frame 49, and the construction and arrangement desirably will be such that when said valve 48 is in closed position, the horizontal disc portion 53 of said rectilinear frame 49 will be in slightly spaced relation to the upper surface of the upper supporting nut 40.

With rise of temperature in the control chamber 33, the rectilinear frame 49 is adapted to be moved upwardly against resilient action of the compression coil springs 59 and 60 thus to cause the valve 48 to become removed from the outlet 46, and with fall of temperature in said control chamber, said rectilinear frame is adapted to be moved downwardly by gravity and by said compression coil springs 59 and 60 thus to cause said valve 48 to close said outlet 46.

The heating apparatus incorporates a heating component which in the disclosure as made is associated or assembled with the connections 31 and 47. Said heating component includes a fluid heating vessel consisting of an outer cylindrical shell 63 and an inner cylindrical core 64, and also includes a burner 65 for causing the fluid heating component to be heated.

The outer cylindrical shell 63 and the inner cylindrical core 64 provide a fluid chamber 66 of the fluid heating vessel between said cylindrical shell 63 and said cylindrical core 64. The lower end of the inner cylindrical core 64 is closed by a wall 67 and the lower end of the fluid chamber 66 is closed by an annular inwardly extending flange upon the lower end of the outer cylindrical shell 63. The upper end of said fluid chamber 66 is closed by an outwardly extending, annular flange 68 upon a closure wall 69 for the upper end of the cylindrical core 64. Said outer cylindrical shell 63 and inner cylindrical core 64 are rigidly assembled together in any suitable and convenient manner.

The connection 47 communicates with a lower portion of the fluid chamber 66, and an upper portion of said fluid chamber 66 communicates with the connection 31. The fluid heating vessel, with appurtenances, is fixedly supported by said connections 31 and 47.

The fluid chamber 66 provided by the outer cylindrical shell 63 and the inner cylindrical core 64 is in surrounding relation to said inner cylindrical core.

As disclosed, the upper closure wall 69 is rigidly and tightly seated in the upper end of the inner cylindrical core 64. An igniter case 70 in spaced relation to said upper closure wall 69 suitably and conveniently supports a re-igniter 71, desirably of ceramic like material, seated, as at 72, in an upper portion of said igniter case. The re-igniter 71 includes a concavity 73 in its upper surface, and apertures 74 extend through the body of said re-igniter. The apertures 74 are in communicating relation at their upper ends with an ignition chamber 75 of the inner cylindrical core 64 above the igniter case 70 and at their lower ends with a combustion chamber 76 of said inner cylindrical core 64 below said igniter case 70 and above a diffusion case 77 also within the inner cylindrical core. The diffusion case 77 is constituted as a hollow cylindrical member having an integral upper closed end 78 and a lower closed end 79. The upper portion of the outer circumferential surface of the diffusion case 77 is in concentric, slightly spaced relation to the inner circumferential surface of the inner cylindrical core 64 thus to provide an annular diffusion passageway 80 between said upper portion of said diffusion case and an intermediate portion of said inner cylindrical core, and the lower portion of said outer circumferential surface of said diffusion case completely fills the inner cylindrical core save for a vertical slot 81, situated adjacent the location where fluid medium is adapted to enter the fluid chamber 66 from the connection 47, affording communication between the annular diffusion passageway 80 and a transverse slot 82 in the lower end portion of the inner cylindrical core 64, below the lower end of the diffusion case 77. The transverse slot 82 opens to a tubular connector 83 in the lower closure wall 67. An outlet pipe 84 from the tubular connector 83 to the intake manifold of the internal combustion engine of the automotive vehicle 20 constitutes an exhaust passageway leading from the burner 65. A screw 85 in the lower closure wall 67, which lower closure wall is rigidly and tightly seated in the lower end of the inner cylindrical core 64, and in the lower closed end 79 of the diffusion case 77 supports said diffusion case in the inner cylindrical core 64, and the diffusion case 77 in turn supports the igniter case 70 up against vertical flanges 86, 86 integral or rigid with the internal surface of the inner cylindrical core 64.

A hollow plug 87 for the passage of combustible mixture into the ignition chamber 75 includes a perforated portion 88 within said ignition chamber. A flame arrester within the perforated portion 88 of the hollow plug 87 is denoted 89, and a port in said hollow plug is indicated 90. As disclosed, the hollow plug 87 is threaded into the upper closure wall 69. A closure for the hollow plug 87 is represented 91.

The burner 65 also includes a resistance element 92 situated in a way 93 directly above the ignition chamber 75 provided by a tube 94 screw threaded into the upper closure wall 69. The upper end of the resistance element 92 is anchored in a conducting entity 95 itself insulatively fixed, as at 96, upon an upper portion of the tube 94, and the lower end of said resistance element is attached to said tube 94.

One end portion of a frame 97 is suitably and conveniently anchored upon the hollow plug 87, and said frame 97 also is rigid with the upper portion of the container 34. An inlet pipe 98 for fluid fuel, such as gasoline mixed with air, is adapted to extend from a carburetor. The inlet pipe 98 is threaded into the frame 97. An inlet passageway 99 in the frame 97 is communicated with by an inlet passageway through the inlet pipe 98, and said inlet passageway 99 leads to the port 90 in the hollow plug 87.

The inlet passageway 99 in said frame 97 extends across a path which is directly above the shut-off valve or cylindrical plunger 57. The construction and arrangement are such that said shut-off valve or cylindrical plunger 57 selectively can be situated across the inlet passageway 99, as in Fig. 5, to close said inlet passageway against flow of combustible mixture, or can be situated below the inlet passageway 99, as in Figs. 3 and 4, to permit flow of combustible mixture through said inlet passageway.

A solenoid 100, suitably and conveniently supported upon the frame 97, includes an armature 101 above and in vertical alinement with the shut-off valve or cylindrical plunger 57. The armature 101 includes a lower reduced portion 102 of cylindrical conformation, and the construction and arrangement are such that the lower reduced portion 102 of said armature 101 selectively can be situated across the inlet passageway 99, as in Fig. 3, or can be situated above said inlet passageway, as in Figs. 4 and 5.

The resistance element 92 is adapted to be energized by electric current from a suitable source, as from a battery 103, which will in practice be the usual battery of an automotive vehicle such as 20. A circuit for said resistance element 92 can include a bimetallic blade 104 insulatively supported, as at 105, upon the outer cylindrical shell 63 of the fluid heating vessel. Spaced apart contacts 106, 106 upon the end portion of said bimetallic blade 104 spaced from its connected end portion are adapted to be engaged with and disengaged from spaced apart contacts 107, 107 insulatively supported upon a strip 108 itself supported, as at 109, upon said outer cylindrical shell 63. The construction and arrangement are such that the contacts 106, 106 upon the bimetallic blade 104 will be engaged with the contacts 107, 107 upon the strip 108 when said bimetallic blade is not heated, and will be removed from said contacts 107, 107 when the bimetallic blade is heated. That is, said bimetallic blade contacts and strip contacts will be engaged when the fluid heating vessel is at low temperature and will become disengaged when said fluid heating vessel is at elevated temperature. The bimetallic blade 104 is situated to absorb heat from the fluid heating vessel, and, in practice, the contacts 106, 106 and 107, 107 become disengaged, to cause the resistance element 92 to become deenergized, when the heater has operated a sufficient period of time to cause the re-igniter 71 to become hot enough to itself support combustion.

The battery 103 is grounded, as at 110, a lead wire 111 extends from said battery to one of the contacts 107, a lead wire 112 extends from the other contact 107 to the conducting entity 95, and the resistance element 92 is grounded. The lead wire 111 includes an ordinary switch 113, as on the panel board 114, a lead wire 115 extends from the lead wire 111 to a terminal 116 upon the solenoid 100, and said solenoid is grounded.

The solenoid 100 suitably and conveniently supports a switch including a fixed insulating element 117 and a flexible conducting element 118 connected to each other, as by an insulating block 119. A contact 120 upon the flexible conducting element 118, in spaced relation to the block 119, is adapted to be engaged with and separated from a contact 121 upon the fixed insulating element 117. A lead wire 122 extends from the terminal 116 to said flexible conducting element 118, and said contact 121 is connected to the coil of the solenoid 100. The fixed insulating element 117 includes a central opening 123 situated directly above the armature 101 of the solenoid 100, and said armature includes an upper reduced end portion 124 adapted to pass freely through said opening 123 to be capable of engaging the flexible conducting element 118 and flexing it upwardly thus to cause the contact 120 to become separated from the contact 121. The switch including the fixed and flexible elements 117 and 118 is adapted to be opened, in a manner to be made clear, in response to actuation of the power element 35 thus to terminate current draw through the solenoid when this is intentional.

As disclosed, the solenoid 100 and the resistance element 92 are connected in parallel. Of course, said solenoid and resistance element could be connected in series so that breaking of the circuit at either the contacts 120, 121 or the contacts 106, 107 would cause both the solenoid and the resistance element to be deenergized.

A pressure relieving construction and arrangement for insuring free and easy reciprocatory movement of the armature 101 of the solenoid 100 is constituted as a relief passageway 125, at the side of said armature 101 adjacent the hollow plug 87 and extending between the guideway for said armature and the inlet passageway 99, and a clearance 126, at and adjacent to the location where the reduced end portion 102 of the armature 101 is adapted to enter said inlet passageway 99. The relief passageway 125 and the clearance 126 are included to the end that load upon the armature 101 tending to interfere with its ready reciprocatory movement may be reduced to a minimum.

The upper closure wall 69, directly over the ignition chamber 75, includes an opening 127 therethrough adapted to be covered by a conical valve 128 supported by a bimetallic arm 129 itself suitably and conveniently mounted upon said upper closure wall. The construction and arrangement are such that the bimetallic arm 129 situates the conical valve 128 in the closed position of the opening 127 when said bimetallic arm is not heated and in the open position of said opening 127 when the bimetallic arm is heated. That is, the bimetallic arm 129 causes the conical valve 128 to be situated to close the opening 127 when the heater is at low temperature and to uncover said opening 127 when said heater is at elevated temperature. In practice, the opening 127 is closed when the heater is started up, so that a relatively rich combustible mixture will be fed to the ignition and combustion chambers of the heater for the commencement of heater operation, and said opening 127 is open after the heater has been put in operation, so that additional air providing a leaner combustible fuel mixture more suitable to operating conditions will be fed to the ignition and combustion chambers, through the hollow plug 87 and the opening 127, after the heater has been started.

In Fig. 3 of the drawings, the parts of the heating apparatus are disclosed as when the switch 113 is open and the resistance element 92 and the solenoid 100 are deenergized. At such time, the reduced lower end portion 102 of the armature 101 is adapted to be situated within the inlet passageway 99, as in said Fig. 3, thus to preclude capacity for flow through said inlet passageway 99.

Figure 4:
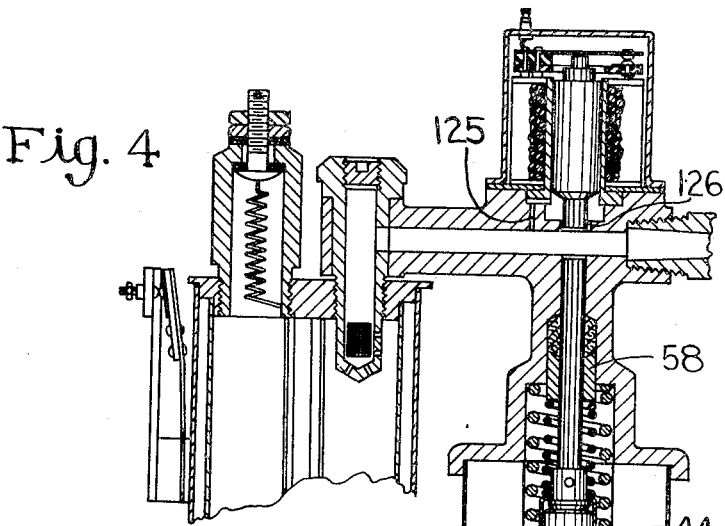
Fig. 4 is a detail sectional view corresponding generally with the disclosure of Fig. 3 but showing operative parts of the heating apparatus in different positions.
Figure 5:
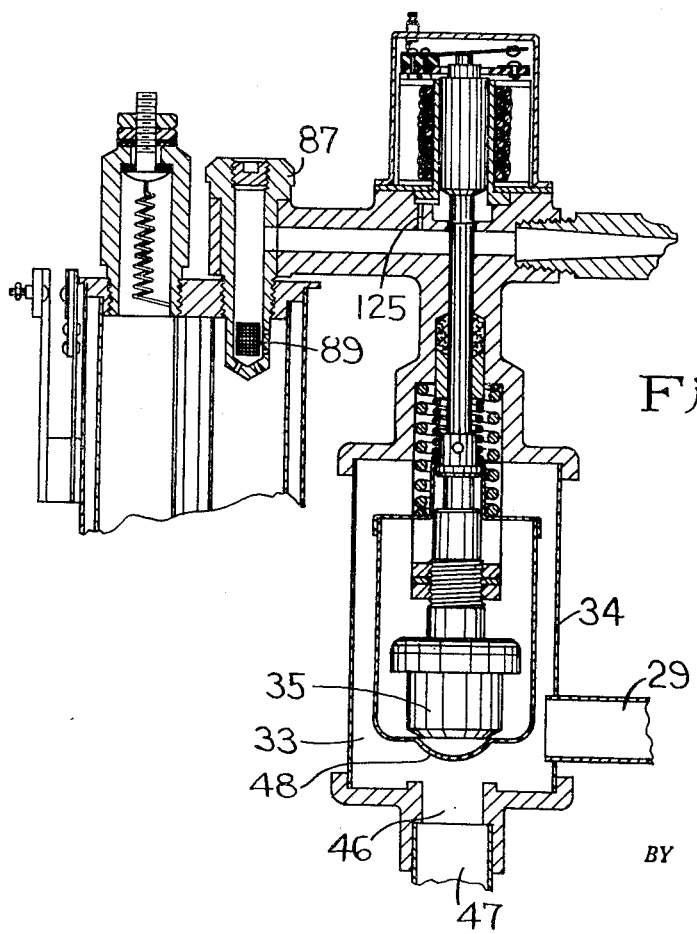
Fig. 5 is a detail sectional view corresponding generally with the disclosure of Figs. 3 and 4 but showing operative parts of said heating apparatus in additional different positions.

In Fig. 4 of the drawings, the parts of the heating apparatus are disclosed as when said switch 113 is closed and the resistance element 92 and the solenoid 100 are energized. Closing of the switch 113 will cause said reduced lower end portion 102 of said armature 101 to be moved from its position as in Fig. 3 to its position as in said Fig. 4 where the reduced lower end portion 102 is shown situated above and clear of the inlet passageway 99 thus to permit capacity for flow through said inlet passageway 99.

Assuming the internal combustion engine of the automotive vehicle 20 to be in operation at the time the solenoid 100 is caused to be energized so that its armature 101 is moved from its position as in Fig. 3 to its position as in Fig. 4, in response to closing of the switch 113, liquid fuel, say, for example, gasoline mixed with air will be drawn or pulled or fed into the ignition chamber 75 of the heater through the inlet pipe 98, the inlet passageway 99 and the hollow plug 87, due to suction created in the intake manifold of said internal combustion engine. The combustible fuel mixture will be ignited by the resistance element 92 and caused to burn in the ignition and combustion chambers 75 and 76. The products of combustion, or hot gases, in passing through the interior of the inner cylindrical core 64 of the fluid heating vessel, through said ignition and combustion chambers, the annular diffusion passageway 80 surrounding the diffusion case 77, the vertical slot 81 and the transverse slot 82, will cause fluid in the fluid chamber 66 to be heated. The products of combustion, when spent and comparatively cool, will pass to the intake manifold of the internal combustion engine. Evidently there will be force or pressure feed of hot fluid upwardly through the fluid chamber 66 caused by force or pressure feed of fluid-cooling or circulating medium of the cooling or circulating system of said internal combustion engine. More explicitly, there will not only be force or pressure feed of fluid-cooling or circulating medium upwardly through the fluid chamber 66 of the fluid heating vessel, but there also will be force or pressure feed of the fluid-cooling or circulating medium upwardly through the heat transfer unit 25 of the heating apparatus. That is, when the elements of said heating apparatus are situated as in Fig. 4, or as in Figs. 3 and 7, fluid-cooling or circulating medium will be forced from the engine jacket 15 through the connection 29 to the control chamber 33, thence through said control chamber and the bleeder hole 56 in the valve 48 to the connection 47, thence through the fluid chamber 66 to the connection 31, thence through the tubular connection 26 to the heat transfer unit, thence upwardly through said heat transfer unit, and thence through the tubular connection 27, the connection 32 and the connection 18 back to the engine jacket. In passing through the heat transfer unit the hot fluid medium will give up its heat to said heat transfer unit, and the fan (not shown) of the heat transfer unit is adapted to cause heat to be dissipated through the automotive vehicle body. The motor (not shown) for the fan of said heat transfer unit can be included in the circuit having the battery 103.

As hereinbefore mentioned, the resistance element 92 is energized during the starting period of the burner, and is thereafter deenergized. Deenergization of said resistance element will occur when the temperature of the bimetallic blade 104 becomes sufficiently high to cause the contacts 106, 107 and 106, 107, respectively, to become separated, as said mentioned contacts are disclosed in Fig. 5 of the drawings. Upon denergization of the resistance element 92 combustion is sustained, so long as the feed of combustible fuel mixture to the ignition chamber 75 is continued, by the re-igniter 71. Also, the conical valve 128 is in closed relation to the opening 127 during the starting period of the burner, and is then moved to open position thus to permit added air for combustion purposes to enter the combustion chamber, as before mentioned.

When the fluid-cooling or circulating medium of the cooling or circulating system of the internal combustion engine of the automotive vehicle 20 is below a set and predetermined temperature at or above which said fluid-cooling or circulating medium should be effective to heat the interior space of the body 22 of the automotive vehicle, the power element 35 will be contracted to cause the shut-off valve or cylindrical plunger 57 to be situated below the inlet passageway 99 and the valve 48 to be in closed position, as in Figs. 3 and 4. Supposing the internal combustion engine of the automotive vehicle 20 to be started up cold with the parts of the heating apparatus positioned as in said Fig. 4, the course of the fluid-cooling or circulating medium of the cooling or circulating system of said internal combustion engine from the engine jacket 15 to the heating apparatus and back to said engine jacket will be through the connection 29 to the control chamber 33, thence through the small bleeder hole 56 in the valve 48, thence through the connection 47 to the fluid chamber 66 of the fluid heating vessel, thence through the connection 31 and the tubular connection 26 to the heat transfer unit 25, and thence through the tubular connection 27, the connection 32 and the connection 18 back to the engine jacket. The fluid-cooling or circulating medium cannot at this time pass freely through said control chamber 33 because the valve 48 is in closed position. Instead, the passage of fluid-cooling or circulating medium through the control chamber 33, and hence through the fluid chamber 66 and the heat transfer unit 25, will be considerably limited by the size of the bleeder hole 56. Due to the comparatively slow travel of fluid medium through said fluid chamber 66 all of the fluid medium which passes the fluid heating vessel is adapted to be thoroughly heated. Upon the heating up of the fluid-cooling or circulating medium due to heating up of the internal combustion engine by operation thereof, said fluid-cooling or circulating medium will, by reason of its contact with the power element 35, cause said power element to become heated. At such time as the temperature of the fluid-cooling or circulating medium of the cooling or circulating system of the internal combustion engine has become heated up to a degree at which it is desirable that the fluid of said cooling or circulating system traverse the heat transfer unit 25 of the heating apparatus in quantity greater than that permitted by the small bleeder hole 56, the power element 35 will have expanded and caused the valve 48 to be moved to open position to allow free or unrestricted communication between the engine jacket and said heat transfer unit 25, of course by way of the control chamber 33 and the fluid chamber 66. Also, at this time, the shut-off valve or cylindrical plunger 57 will have entered the inlet passageway 99 and cause said inlet passageway to be shut off. Desirably, with elevation of the temperature of the power element 35 adapted to cause the valve 48 to be opened, said shut-off valve or cylindrical plunger 57 not only will have entered the inlet passageway 99 to cause flow of gaseous fuel mixture to be terminated, but also will have become elevated to position, as in Fig. 5 of the drawings, where it has elevated the armature 101 of the solenoid 100 to cause the contacts 120, 121 of the switch in the case of said solenoid to be separated, thus to cause the solenoid to be deenergized. That is, the shut-off valve or cylindrical plunger 57 is operative in response to elevation of temperature in the control chamber 33 to cause the valve 48 to be opened, the inlet passageway 99 to be closed, and the solenoid 100 to be deenergized. Deenergization of said solenoid is accomplished by upward movement of the shut-off valve or cylindrical plunger 57 which in turn accomplishes upward movement of the armature 101 to extent adapted to cause the contact 120 upon the flexible conducting element 118 to be separated from the contact 121 upon the fixed insulating element 117. Obviously, when the valve 48 is in wide open position, the flow of fluid medium through the control chamber 33, the fluid chamber 66 and the heat transfer unit 25 will be considerably more rapid than when said valve 48 is in closed position and the flow is restricted or limited to that which can pass the bleeder hole 56.

During the interval the internal combustion engine is warming up, the heating apparatus operates in the manner and to the purpose as aforesaid, and when the temperature of the fluid-cooling or circulating medium of the internal combustion engine cooling or circulating system becomes sufficiently warm or hot effectively to heat the interior of the automotive vehicle body, operation of said heating apparatus is concluded. That is, the inlet passageway 99 is shut off to terminate the drawing or pulling or feeding of combustible fuel mixture into the ignition chamber. Also, the solenoid 100 is deenergized in the manner as set forth. The resistance element 92 likewise becomes deenergized when the internal combustion engine becomes heated up, and with cessation of feed of combustible fuel mixture to the ignition and combustion chambers, the re-igniter 71 eventually loses its heat. Desirably, the arrangement will be such that the resistance element 92 will stay deenergized so long as the temperature of the fluid-cooling or circulating medium remains sufficiently warm or hot effectively to heat the vehicle body. Stated differently, the bimetallic blade 104 is adapted to receive heat from fluid medium which passes through the fluid chamber 66 of the fluid heating vessel, as well as from said fluid heating vessel, to cause the contacts 106, 107 to be separated when the fluid heating medium is sufficiently warm or hot effectively to heat the automotive vehicle body and to be engaged when the temperature of the fluid heating medium is reduced below the temperature at which it effectively will heat said vehicle body. Or, an alternative arrangement could provide that the resistance element 92 remain energized at all times except when the re-igniter 71 is sufficiently hot to itself sustain combustion. In any instance where preferred, the circuit including the resistance element 92 can be broken manually after the re-igniter 71 has become sufficiently heated to sustain combustion. It is desirable that the conical valve 128 be in closed position at all times when the re-igniter 71 is not capable of sustaining combustion.

While the power element 35 is expanded and hot fluid medium is being caused to circulate from the engine jacket to the heat transfer unit and back to the jacket, the course of flow of hot fluid medium is the same as before, except that the flow is not restricted. Both when the valve 48 is open and closed, hot fluid medium is forced to flow upwardly through the heat transfer unit 25. The direction of flow through said heat transfer unit of course can be downwardly in any instance where this may be considered preferable. Should the temperature of the fluid-cooling or circulating medium become too low for effective heating of the automotive vehicle body during operation of the internal combustion engine, the parts of the heating apparatus will become operated to the positions as in Fig. 4 of the drawings, and the special heating construction and arrangement will be set in operation while pressure or force feed causes flow of fluid medium through the heating apparatus past the bleeder hole 56.

While in the disclosure as made heating fluid medium forced through the bleeder hole 56, as well as through the heat transfer unit 25, is from and circulated by the internal combustion engine cooling or circulating system, heating fluid medium, in some instance or other, could be forced past the bleeder hole and said heat transfer unit through the instrumentality of means other than said cooling or circulating system when the valve 48 is closed. In fact, the fluid medium forced through the heat transfer unit 25 while the valve 48 is in closed position could be supplied from a source other than the cooling or circulating system of the internal combustion engine.

As hereinbefore set forth, the relatively light compression coil spring 59 is under compression between the packing 58 and the inwardly extending annular flange 51 upon the upper, vertical collar portion 50 of the rectilinear frame 49. It is the function of said compression coil spring 59 to retain said packing 58 in effective sealing position without offering more than negligible friction or resistance to ready and easy vertical sliding movement of the shut-off valve or cylindrical plunger 57. The packing 58 would be required to be in closer frictional relation to said shut-off valve or cylindrical plunger than is the case when said compression coil spring 59 is employed. The compression coil spring 59 exerts minimum resilient pressure upwardly against the packing 58 toward its sealing direction when the valve 48 is in closed position as in Figs. 3 and 4, and exerts maximum resilient pressure upwardly against said packing 58 when said valve 48 is in open position as in Fig. 5. It is to be emphasized that power is employed both to seal the shut-off valve or cylindrical plunger 57 against leakage and to overcome the friction caused by the power sealing of said shut-off valve or cylindrical plunger, as well as to return the actuating rod 45 to its inner position and to retain the valve 48 upon its seat when this is intentional.

In practical operation of the heating apparatus, let it be supposed that a person intending to operate the automotive vehicle 20 starts up the internal combustion engine thereof in winter and when cold, and also closes a switch, or switches, of said heating apparatus which causes the resistance element 02, the solenoid 100 and the electric motor for driving the fan of the heat transfer unit 25 to be energized. In but a few seconds substantial heat will be produced in the automotive vehicle body through the instrumentality of hot fluid fed to the heat transfer unit 25 by the special heating device of the heating apparatus. When the automotive vehicle has been driven a distance, the fluid-cooling or circulating medium of the cooling or circulating system of the internal combustion engine will become sufficiently heated to supply or provide heating medium hot enough to effectively warm the interior space of said automotive vehicle body, and control for the heating medium for the heat transfer unit 25 will be turned over to the internal combustion engine cooling or circulating system and taken away from the special heating device. Thereafter, should the temperature of the fluid-cooling or circulating medium of the cooling or circulating system of the internal combustion engine drop to a temperature too low to effectively heat the interior space of the automotive vehicle body, control of the heating medium for said heat transfer unit 25 will be turned back to the special heating device and taken away from the internal combustion engine cooling or circulating system.

What is claimed is:

1. In a heating apparatus for supplying heated fluid medium to a heat exchanger or the like, the combination comprising means forming a burner and combustion chamber, a fluid heating space associated therewith, means for supplying fluid to be heated to said space including a valve movable into and out of flow restricting position, a temperature responsive power element for moving said valve in response to variations in the temperature of the fluid at the inlet to said fluid heating space, means for supplying a combustible fuel mixture to said burner including an electromagnetically operated first valve and a second valve, a circuit for connecting said electromagnetically operated valve to a source of current, a pair of switches in said circuit including a manually controlled switch, and means to render the power element effective when it moves the fluid flow control valve out of flow restricting position to move said second fuel supply control valve in a direction to interrupt the supply of fuel to said burner and the second of said switches in said circuit to open position for opening the circuit to said electromagnetically operated valve irrespective of the position of the manually controlled switch.

2. In a heating apparatus for supplying heated fluid medium to a heat exchanger or the like the combination comprising means forming a burner and combustion chamber, a fluid heating space in heat exchange relation with said burner and combustion chamber, means for supplying fluid to be heated to said heating space including a valve movable into and out of flow restricting position, an expansible and contractible temperature responsive element for moving said valve in response to variations in the temperature of said fluid; means forming a passageway for supplying a combustible fuel mixture to said burner, opposed first and second valve means movable alternately into closing relation with said passageway, electromagnetic means to move said first valve including an armature, a control circuit for said heater including a circuit to connect said electromagnetic means to a source of current and a manually operable switch, a second switch in said circuit having a movable contact biased to closed position and aligned with one end of said armature, and means operatively to connect said temperature responsive element to the second valve and armature to render the temperature responsive means effective to move said second valve into closing relation with said passageway and said first valve and the armature in a direction to open said second switch in response to movement of the temperature responsive means carrying said fluid flow control valve away from said seat.

3. In a heating apparatus for supplying heated fluid medium to a heat exchanger or the like the combination comprising means forming a burner and combustion chamber, a fluid heating space in heat exchange relation with said burner and combustion chamber, means for supplying fluid to be heated to said heating space including an auxiliary chamber having an outlet connected to said fluid heating space and provided with a valve seat, a valve movable toward and from said seat to control flow of fluid through said outlet, means to move said valve including an expansible and contractible power element responsive to the temperature of the fluid in said chamber, means for supplying a combustible fuel mixture to said burner including a control head having a passageway for the flow of fuel to said burner and a bore extending across said passageway and having a cross sectional area at least equal to the cross sectional area of the passageway, electromagnetic means including an armature having an extension reciprocable in one end of said bore into and out of closing relationship with said passageway, a fuel flow control valve in said bore opposed to said extension and reciprocable into and out of closing relationship with said passageway, a control circuit for said heater including a circuit to connect said electromagnetic means to a source of electric current and a pair of switches including a manually operable switch to control energization of said control circuit, means carried by said armature for opening said second switch in response to movement of the armature in one direction, and means operatively to connect said fuel flow control valve and temperature responsive element to render the latter effective to move the said valve into closing relation with said passageway and said armature in a direction to open said second switch when the temperature responsive element moves said fluid flow control valve away from said seat.

4. The combination with the fluid cooling system of an internal combustion engine of an independent fluid heating means including a burner and a combustion chamber, a fluid heating space heated thereby, a heat exchanger supplied with heated fluid from said space, means for supplying fluid to be heated from said fluid cooling system to said heating space including a valve movable into and out of flow restricting position, means to move said valve including a thermostatic element responsive to the temperature of the fluid admitted to said space, means for supplying a combustible fuel mixture to said burner including a control head having a passageway therein, an igniter, a fuel supply control valve movable into and out of closing relationship with said passageway, means including electromagnetic means to operate said fuel supply control valve, a circuit for connecting said electromagnetic means and igniter to a source of current, a switch manually operable to close and open said circuit for energizing said igniter and rendering said electromagnetic means effective to move said fuel supply control valve between open and closed position, thermostatic means to de-energize said igniter independently of said manually operable switch, and a second fuel control valve operable by said thermostatic element to close communication through said fuel passageway when the thermostatic element moves said fluid flow control valve away from flow restricting position irrespective of the position of said manually operable switch.

5. The combination with the fluid cooling system of an internal combustion engine of an independent fluid heating means including a burner and a combustion chamber, a fluid heating space heated thereby, a heat exchanger supplied with heated fluid from said space, means for supplying fluid to be heated from said fluid cooling system to said heating space including a valve movable into and out of flow restricting position, means to move said valve including a thermostatic element responsive to the temperature of the fluid admitted to said space, means for supplying a combustible fuel mixture to said burner including a control head having a passageway therein and a bore extending across the passageway, an igniter, opposed plunger-like valves in said bore relatively movable toward each other to close said fuel supply passageway and from each other to open the same, electromagnetic means cooperating with said thermostatic element to move said valves, circuits to connect said electromagnetic means and igniter to a source of current, and control means operable in response to relative movement of said valves toward each other under the influence of said temperature responsive element to open the circuit to said electromagnetic means.

6. The combination with the fluid cooling system of an internal combustion engine of an independent fluid heating means including a burner and a combustion chamber, a fluid heating space heated thereby, a heat exchanger supplied with heated fluid from said space, means for supplying fluid to be heated from said fluid cooling system to said heating space including a valve movable into and out of flow restricting position, means to move said valve including a thermostatic element responsive to the temperature of the fluid admitted to said space, means for supplying a combustible fuel mixture to said burner including a control head having a passageway therein and a bore extending across the passageway, an igniter, opposed plunger-like valves in said bore relatively movable toward each other to close said fuel supply passageway and from each other to open the same, electromagnetic means cooperating with said thermostatic element to move said valves, circuits to connect said electromagnetic means and igniter to a source of current, control means operable in response to relative movement of said valves toward each other under the influence of said temperature responsive element to open the circuit to said electromagnetic means, temperature responsive means to open the circuit to said igniter in response to a predetermined increase in the temperature of said burner, and a manually controlled switch to open both said circuits.

7. In a heating apparatus for supplying heating fluid to a heat exchanger or the like, the combination comprising means forming a burner and combustion chamber, a fluid heating space in heat exchange relation with said burner and combustion chamber, means for supplying fluid to be heated to said heating space including an auxiliary chamber having an outlet connected to said fluid heating space and provided with a valve seat, a valve movable toward and from said seat to control flow of fluid through said outlet, means to move said valve including a temperature responsive element responsive to the temperature of the fluid in said chamber, means for supplying a combustible fuel mixture to said burner including a control head having a passageway for the flow of fuel to said burner and a bore extending across said passageway, valve means to close communication through said passageway, means to move said valve means between open and closed position including a manually operable control, a second valve means movable into and out of closing relationship with said passageway and including a plunger reciprocable in said bore, said plunger extending into said chamber and being operatively connected to said temperature responsive element to render the latter effective to move the plunger into closing relation with said passageway when said fluid flow control valve is moved away from said seat, packing to form a fluidtight seal along the bore and plunger between the chamber and passageway, a follower for said packing loosely surrounding said plunger, and a spring to urge said follower in a direction to compress said packing disposed between said temperature responsive element and follower so that the spring is compressed when the temperature responsive element moves said fluid flow control valve away from said seat and said plunger across said passageway.

8. In a heating apparatus for supplying heated fluid medium to a heat exchanger or the like, the combination comprising means forming a burner and a combustion chamber, a control head having a passageway formed therein for supplying a combustible fuel mixture adapted to be connected adjacent one end to a source of fuel and having a cross bore adjacent the opposite end, a fitting extending through said bore and threaded into an aperture in said burner for fixedly anchoring said head to said burner, said fitting having a passageway communicating with the passageway in said control head and the interior of said burner to form an inlet to the latter, means for supplying fluid to be heated to said heating space including a control chamber carried by said control head and having an outlet connected to said fluid heating space, a valve to control flow through said outlet, an expansible and contractible temperature responsive element for moving said valve in response to variations in the temperature of the fluid to be heated, a pair of valves to control flow of fuel through said passageway including an electromagnetically operated valve and a second valve, a circuit for connecting said electromagnetically operated valve to a source of current, a pair of switches in said circuit including a manually controlled switch, and means to render the temperature responsive element effective when it moves the fluid flow control valve out of flow restricting position to move said second fuel supply control valve in a direction to interrupt the supply of fuel to said burner and the second of said switches in said circuit to open position for opening the circuit to said electromagnetically operated valve irrespective of the position of the manually controlled switch.

9. The combination with the fluid cooling system of an internal combustion engine of an independent fluid heating means including a burner and a combustion chamber, a fluid heating space heated thereby, a heat exchanger supplied with heated fluid from said space, means for supplying fluid to be heated from said cooling system to said space including a valve movable into and out of flow restricting position, an expansible and contractible temperature responsive power element for moving said valve in response to variations in the temperature of the fluid at the inlet to said fluid heating space, means for supplying a combustible fuel mixture to said burner including an electromagnetically operated first valve and a second valve, an igniter for said burner, a circuit for connecting said electromagnetically operated valve and said igniter to a source of current, a temperature responsive switch in said circuit to deenergize said igniter when the temperature of the burner rises to a predetermined level, a manually controlled switch in said circuit, a second switch to control energization of said electromagnetically operated valve, means to render the power element effective when it moves the fluid flow control valve out of flow restricting position to move said second fuel supply valve in a direction to interrupt the supply of fuel to said burner and said second switch to open position to deenergize said electromagnetically operated valve, said burner having an aperture extending through one wall thereof for supplying air for combustion, a valve to close said aperture, and temperature responsive means to open said valve when the temperature in said burner rises to a predetermined point.

HARRY J. ROSE.

REFERENCES CITED

The following references are of record in the file of this patent:

UNITED STATES PATENTS

| Number | Name | Date |
| --- | --- | --- |
| 2,060,994 | Kindervater | Nov. 17, 1936 |
| 2,076,768 | Denison | Apr. 13, 1937 |
| 2,237,720 | Waddell | Apr. 8, 1941 |
| 2,277,598 | McCollum | Mar. 24, 1942 |
| 2,286,853 | Holthouse | June 16, 1942 |
| 2,292,830 | Gauger et al. | Aug. 11, 1942 |
| 2,300,011 | Rose | Oct. 27, 1942 |
| 2,300,899 | Andersson | Nov. 3, 1942 |
| 2,463,908 | Rose | Mar. 8, 1949 |